United States Patent
Zuo et al.

(10) Patent No.: US 12,554,267 B2
(45) Date of Patent: Feb. 17, 2026

(54) AUTOMATIC DRIVING METHOD OF AN AGRICULTURAL MACHINE, APPARATUS AND SYSTEM, AND NON-TRANSITORY COMPUTER-READABLE STORAGE MEDIUM

(71) Applicants: JIANGSU XCMG CONSTRUCTION MACHINERY RESEARCH INSTITUTE LTD., Xuzhou (CN); XCMG AGRICULTURAL EQUIPMENT TECHNOLOGY CO., LTD., Xuzhou (CN)

(72) Inventors: Shuai Zuo, Xuzhou (CN); Liang Gao, Xuzhou (CN); Ming Chen, Xuzhou (CN); Chenghao Liu, Xuzhou (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 289 days.

(21) Appl. No.: 18/270,380

(22) PCT Filed: Dec. 21, 2022

(86) PCT No.: PCT/CN2022/140777
§ 371 (c)(1),
(2) Date: Jun. 29, 2023

(87) PCT Pub. No.: WO2024/098518
PCT Pub. Date: May 16, 2024

(65) Prior Publication Data
US 2025/0004479 A1    Jan. 2, 2025

(30) Foreign Application Priority Data
Nov. 11, 2022  (CN) .......................... 202211411487.3

(51) Int. Cl.
G05D 1/00    (2024.01)
G05D 1/24    (2024.01)
(Continued)

(52) U.S. Cl.
CPC ............... *G05D 1/646* (2024.01); *G05D 1/24* (2024.01); *G05D 2105/15* (2024.01); *G05D 2107/21* (2024.01); *G05D 2111/10* (2024.01)

(58) Field of Classification Search
CPC ...... G05D 1/646; G05D 1/24; G05D 2105/15; G05D 2107/21; G05D 2111/10;
(Continued)

(56) References Cited

U.S. PATENT DOCUMENTS

2021/0360850 A1* 11/2021 Wu ..................... A01D 41/1278
2024/0142983 A1*  5/2024 Clare .................. G05D 1/0274

FOREIGN PATENT DOCUMENTS

| CN | 103901833 A | 7/2014 |
| CN | 106774297 A | 5/2017 |

(Continued)

OTHER PUBLICATIONS

International Search Report from corresponding International Application No. PCT/CN2022/140777, dated Jun. 16, 2023, 16 pages with translation.
(Continued)

*Primary Examiner* — Aniss Chad
*Assistant Examiner* — Hussam Aldeen Alzateemeh
(74) *Attorney, Agent, or Firm* — Tucker Ellis LLP

(57) ABSTRACT

This disclosure relates to an automatic driving method, apparatus and system, and a non-transitory computer-readable storage medium, and relates to the field of agricultural machine automatic driving. The automatic driving method includes acquiring a trajectory of travel of an agricultural machine on a current row and an image of an operated area
(Continued)

of a farm implement connected with the agricultural machine on the current row; determining a boundary of the operated area of the farm implement on the current row according to the image of the operated area of the farm implement on the current row; determining an operating width of the farm implement; and determining a space between a trajectory of travel of the agricultural machine on a next row and the trajectory of travel of the agricultural machine on the current row.

14 Claims, 5 Drawing Sheets

(51) Int. Cl.
    *G05D 1/646*     (2024.01)
    *G05D 105/15*     (2024.01)
    *G05D 107/20*     (2024.01)
    *G05D 111/10*     (2024.01)

(58) Field of Classification Search
    CPC .... G05D 1/672; G05D 2109/10; G05D 1/243; A01B 69/00; G01C 21/34
    USPC .......................................................... 701/50
    See application file for complete search history.

(56) References Cited

FOREIGN PATENT DOCUMENTS

| | | |
|---|---|---|
| CN | 108958260 A | 12/2018 |
| CN | 112229415 A | 1/2021 |
| CN | 114594773 A | 6/2022 |
| CN | 114721399 A | 7/2022 |
| CN | 115290095 A | 11/2022 |
| JP | 2011254704 A | 12/2011 |
| JP | 2022150534 A | 10/2022 |
| WO | 2019124217 A1 | 6/2019 |

OTHER PUBLICATIONS

Chinese Office Action from corresponding Application No. 202211411487.3 mailed on Dec. 31, 2024, 18 pages with translation.

* cited by examiner

AUTOMATIC DRIVING METHOD OF AN AGRICULTURAL MACHINE, APPARATUS AND SYSTEM, AND NON-TRANSITORY COMPUTER-READABLE STORAGE MEDIUM

CROSS-REFERENCE TO RELATED APPLICATIONS

This application is a U.S. National Stage Application under 35 U.S.C. § 371 of International Patent Application No. PCT/CN2022/140777, filed on Dec. 21, 2022, which is based on and claims the priority to the Chinese patent application No. 202211411487.3 filed on Nov. 11, 2022, the disclosures of both of which are hereby incorporated in its entirety into the present application.

TECHNICAL FIELD

This disclosure relates to the field of agricultural machine automatic driving, and in particular, to an automatic driving method, apparatus and system, and a computer-readable storage medium.

BACKGROUND

With the development of automatic driving technology, agricultural machine with navigation and automatic driving systems is gradually popularized, and popularization and application of technology of fusion of agricultural mechanization and informatization are also continuously developed. Agricultural machine automatic driving has many advantages, such as: no dependence on driving experience of a driver, good straightness and high precision of joint lines. The automatic navigation system is particularly suitable for large-scale operation of a large plot and operation with high requirements on a planting row space. Agricultural machine automatic navigation can bring positive and beneficial effects for many aspects such as operation standardization, land utilization rate and operation efficiency of agricultural machine, and played a positive and powerful role in helping precise agricultural development.

In the agricultural machine automatic driving, a blank space left between handover rows shall be considered. The handover rows are also called connection rows or joint ridges. In agricultural production, the agricultural machine travels in a row direction, and after travelling to an end of an operation area along a current row, it travels to a next row, and operates along the next row. Due to requirements on the agricultural production, a certain space needs to be left between the handover rows. If the space between adjacent operation rows is unreasonable, crop growth will be affected.

SUMMARY

According to a first aspect of the present disclosure, there is provided an automatic driving method, comprising: acquiring a trajectory of travel of an agricultural machine on a current row and an image of an operated area of a farm implement connected with the agricultural machine on the current row; determining a boundary of the operated area of the farm implement on the current row according to the image of the operated area of the farm implement on the current row; determining an operating width of the farm implement according to the trajectory of travel of the agricultural machine on the current row and the boundary of the operated area of the farm implement on the current row, wherein the operating width of the farm implement comprises an operating width of the farm implement on at least one side of two sides of the trajectory of travel of the agricultural machine on the current row; and determining a space between a trajectory of travel of the agricultural machine on a next row and the trajectory of travel of the agricultural machine on the current row according to the operating width of the farm implement and a blank space between the current row and the next row.

In some embodiments, the determining an operating width of the farm implement according to the trajectory of travel of the agricultural machine on the current row and the boundary of the operated area of the farm implement on the current row comprises: determining an operating width of the farm implement on one side of the trajectory of travel according to a distance between the trajectory of travel of the agricultural machine on the current row and a boundary of the operated area on the one side of the two sides of the trajectory of travel of the agricultural machine on the current row.

In some embodiments, the boundary of the operated area on the one side of the two sides of the trajectory of travel of the agricultural machine on the current row comprises a plurality of trajectory points, and the determining an operating width of the farm implement on one side of the trajectory of travel according to a distance between the trajectory of travel of the agricultural machine on the current row and a boundary of the operated area on the one side of the two sides of the trajectory of travel of the agricultural machine on the current row comprises: determining the operating width of the farm implement on the one side of the trajectory of travel according to an average value of vertical distances between the plurality of trajectory points of the boundary of the operated area on the one side of the two sides of the trajectory of travel of the agricultural machine on the current row and the trajectory of travel of the agricultural machine on the current row.

In some embodiments, the determining an operating width of the farm implement according to the trajectory of travel of the agricultural machinery on the current row and the boundary of the operated area of the farm implement on the current row comprises: determining an operating width of the farm implement in a global coordinate system according to a trajectory of travel of the agricultural machine on the current row in the global coordinate system and a boundary of the operated area of the farm implement on the current row in the global coordinate system.

In some embodiments, the acquiring an image of an operated area of a farm implement connected with the agricultural machine on the current row comprises: acquiring the image of the operated area of the farm implement on the current row from a camera mounted on the agricultural machine.

In some embodiments, the determining a boundary of the operated area of the farm implement on the current row according to the image of the operated area of the farm implement on the current row comprises: determining the boundary of the operated area of the farm implement on the current row in a camera coordinate system of the camera according to the image of the operated area of the farm implement on the current row; and determining the boundary of the operated area of the farm implement on the current row in the global coordinate system according to the boundary of the operated area of the farm implement on the current row in the camera coordinate system, and a coordinate and a rotation parameter of the camera in the global coordinate system.

In some embodiments, the acquiring a trajectory of travel of an agricultural machine on a current row comprises: acquiring positioning information of the agricultural machine from a positioning apparatus mounted on the agricultural machine; and determining the trajectory of travel of the agricultural machine on the current row in the global coordinate system according to the positioning information of the agricultural machine.

In some embodiments, the determining a space between a trajectory of travel of the agricultural machine on a next row and the trajectory of travel of the agricultural machine on the current row according to the operating width of the farm implement and a blank space between the current row and the next row comprises: determining the space between the trajectory of travel of the agricultural machine on the next row and the trajectory of travel of the agricultural machine on the current row according to the operating width of the farm implement, the blank space between the current and the next row, a direction of travel of the agricultural machine on the current row and a direction of travel of the agricultural machine on the next row.

In some embodiments, the determining the space between the trajectory of travel of the agricultural machine on the next row and the trajectory of travel of the agricultural machine on the current row according to the operating width of the farm implement, the blank space between the current row and the next row, a direction of travel of the agricultural machine on the current row and a direction of travel of the agricultural machine on the next row comprises: in a case where the direction of travel of the agricultural machine on the current row is the same as the direction of travel of the agricultural machine on the next row, determining the space between the trajectory of travel of the agricultural machine on the next row and the trajectory of travel of the agricultural machine on the current row according to a sum of the operating width of the farm implement on the one side of the two sides of the trajectory of travel of the agricultural machine on the current row, an operating width of the farm implement on the other side of the two sides of the trajectory of travel of the agricultural machine on the current row, and the blank space between the current row and the next row.

In some embodiments, the determining the space between the trajectory of travel of the agricultural machine on the next row and the trajectory of travel of the agricultural machine on the current row according to the operating width of the farm implement, the blank space between the current row and the next row, a direction of travel of the agricultural machine on the current row and a direction of travel of the agricultural machine on the next row comprises: in a case where the direction of travel of the agricultural machine on the current row is different from the direction of travel of the agricultural machine on the next row, determining the space between the trajectory of travel of the agricultural machine on the next row and the trajectory of travel of the agricultural machine on the current row according to a sum of twice an operating width on a same side of the trajectory of travel as the next row and the blank space between the current row and the next row.

According to a second aspect of the present disclosure, there is provided an automatic driving apparatus, comprising: an acquisition means configured to acquire a trajectory of travel of an agricultural machine on a current row and an image of an operated area of a farm implement connected with the agricultural machine on the current row; a boundary determination means configured to determine a boundary of the operated area of the farm implement on the current row according to the image of the operated area of the farm implement on the current row; an operating width determination means configured to determine an operating width of the farm implement according to the trajectory of travel of the agricultural machine on the current row and the boundary of the operated area of the farm implement on the current row, wherein the operating width of the farm implement comprises an operating width of the farm implement on at least one side of two sides of the trajectory of travel of the agricultural machine on the current row; and a space determination means configured to determine a space between a trajectory of travel of the agricultural machine on a next row and the trajectory of travel of the agricultural machine on the current row according to the operating width of the farm implement and a blank space between the current row and the next row.

According to a third aspect of the present disclosure, there is provided an automatic driving apparatus, comprising: a memory; and a processor coupled to the memory, the processor being configured to perform, based on instructions stored in the memory, the automatic driving method according to any of the embodiments of the present disclosure.

According to a fourth aspect of the present disclosure, there is provided a computer-readable storage medium having thereon stored computer program instructions which, when executed by a processor, implement the automatic driving method according to any of the embodiments of the present disclosure.

According to a fifth aspect of the present disclosure, there is provided an automatic driving system, comprising: the automatic driving apparatus according to any of the embodiments of the present disclosure; a positioning apparatus configured to generate positioning information of the agricultural machine; and a camera configured to generate the image of the operated area of the farm implement on the current row.

According to a sixth aspect of the present disclosure, there is provided an agricultural machine, comprising: the automatic driving apparatus according to any of the embodiments of the present disclosure; and a positioning apparatus configured to generate positioning information of the farm implement.

In some embodiments, the agricultural machine further comprises: a camera configured to generate the image of the operated area of the farm implement on the current row.

BRIEF DESCRIPTION OF THE DRAWINGS

The accompanying drawings, which constitute a part of this specification, illustrate embodiments of the present disclosure and together with the description, serve to explain the principle of the present disclosure.

The present disclosure can be more clearly understood according to the following detailed description with reference to the accompanying drawings, in which.

DETAILED DESCRIPTION

Figure 1:
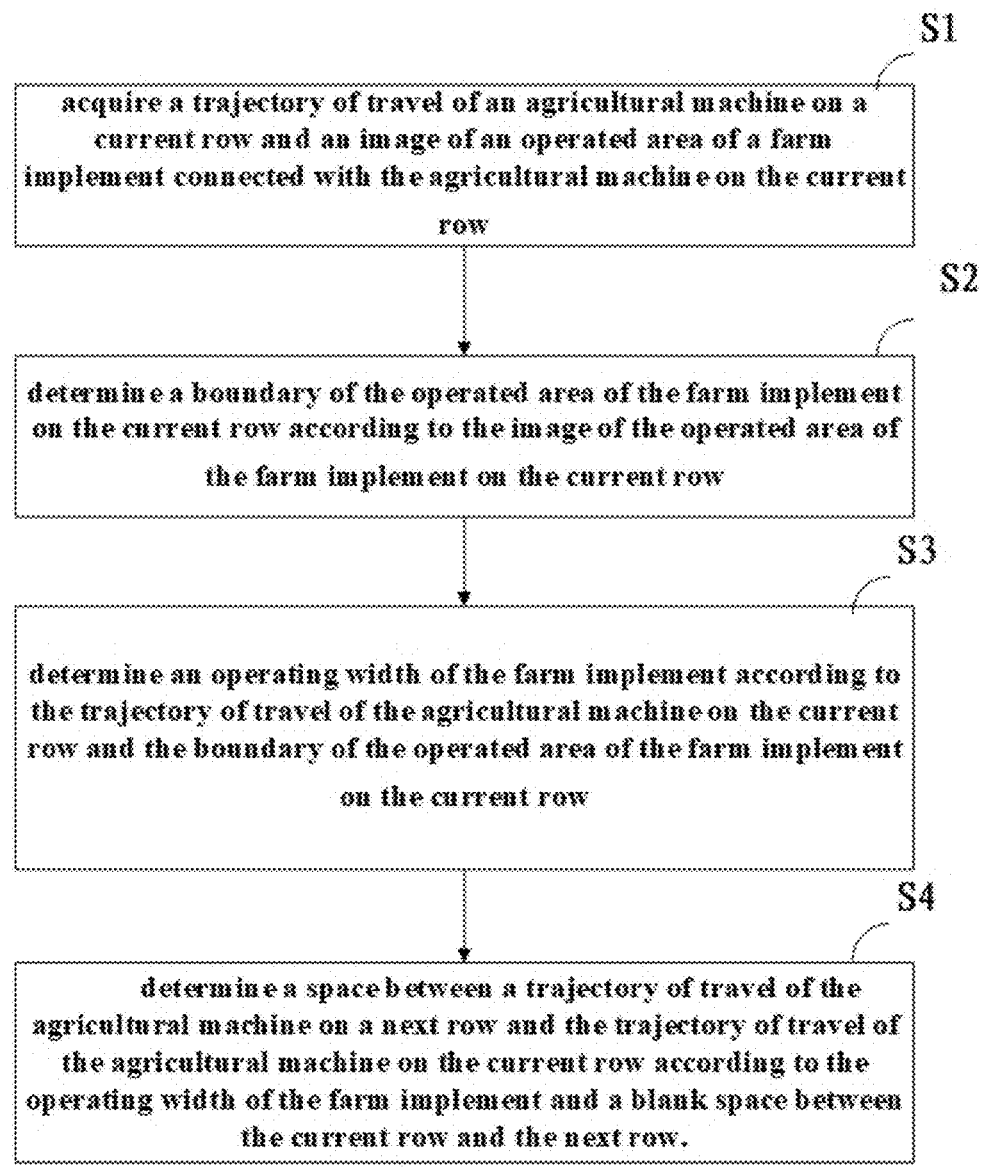
FIG. 1 illustrates a flow diagram of an automatic driving method according to some embodiments of the present disclosure.

Various exemplary embodiments of the present disclosure will now be described in detail with reference to the accompanying drawings. It should be noted that: relative arrangements of components and steps, numerical expressions and numerical values set forth in these embodiments do not limit the scope of the present disclosure unless specifically stated otherwise.

Meanwhile, it should be understood that a size of each portion shown in the drawings is not drawn to an actual scale for the convenience of description.

The following description of at least one exemplary embodiment is merely illustrative in nature and is in no way intended to limit this disclosure and its applications or uses.

Techniques, methods, and devices known to one of ordinary skill in the related art may not be discussed in detail but should be deemed as part of the specification where appropriate.

In all examples shown and discussed herein, any specific value should be construed as exemplary only and not as limiting. Thus, other examples of the exemplary embodiments can have different values.

It should be noted that: similar reference numbers and letters refer to similar items in the following drawings, and thus, once a certain item is defined in one drawing, it does not need to be discussed further in subsequent drawings.

In a process of production operation of an agricultural machine, due to problems such as a mechanical connection gap between installations of the agricultural machine and the farm implement, complexity of farmland topography and the like, an actual operating width of the farm implement will be offset to be inconsistent with a theoretical width of the farm implement. If the agricultural machine travels according to the theoretical operating width, that will cause an unreasonable space between adjacent operation rows, thereby affecting growth of crops.

In the related art, the offset of the farm implement is corrected by adopting manual calibration, which is inefficient and costly, and low in precision of the manual calibration; or the operating width is calculated by using a theoretical offset, which is low in calibration precision.

FIG. 1 illustrates a flow diagram of an automatic driving method according to some embodiments of the present disclosure.

As shown in FIG. 1, the automatic driving method comprises steps S1 to S4.

In the step S1, a trajectory of travel of an agricultural machine on a current row and an image of an operated area of a farm implement connected with the agricultural machine on the current row are acquired.

Figure 2:
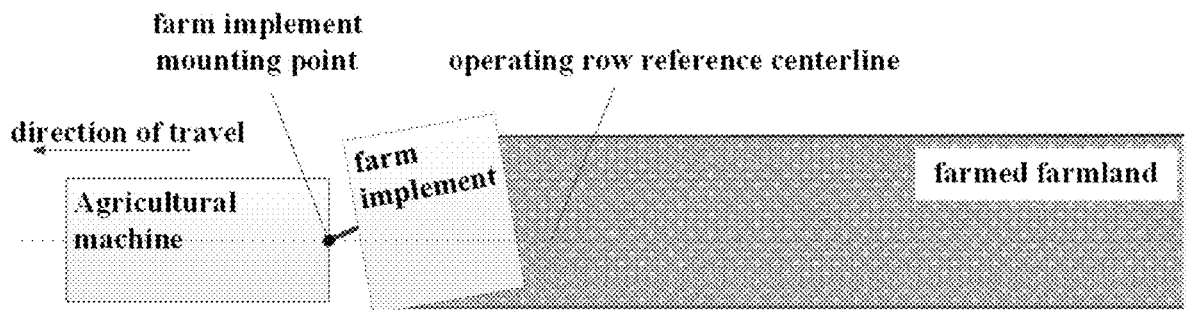
FIG. 2 illustrates a top view of an operation scenario according to some embodiments of the present disclosure.

FIG. 2 illustrates a top view of an operation scenario according to some embodiments of the present disclosure.

As shown in FIG. 2, an agricultural machine mounts a farm implement and travels for operation in farmland. The agricultural machine travels along the current row, and the farm implement mounted behind the agricultural machine operates on the current row. An operation row reference centerline in FIG. 2 is the trajectory of travel of the agricultural machine on the current row. Farmed farmland behind the agricultural machine (a grey area in FIG. 2) is the operated area of the farm implement on the current row.

In some embodiments, the acquiring an image of an operated area of a farm implement connected with the agricultural machine on the current row comprises: acquiring the image of the operated area of the farm implement on the current row from a camera mounted on the agricultural machine.

For example, the camera mounted on the agricultural machine shoots backwards (in a direction opposite to a direction of travel of the agricultural machine) for images of the farmed farmland on the current row, i.e., the gray area in FIG. 2.

In some embodiments, the acquiring a trajectory of travel of an agricultural machine on a current row comprises: acquiring positioning information of the agricultural machine from a positioning apparatus mounted on the agricultural machine; and determining the trajectory of travel of the agricultural machine on the current row in a global coordinate system according to the positioning information of the agricultural machine.

For example, the positioning apparatus mounted on the agricultural machine is used for detecting the positioning information of the agricultural machine. A line connected by multiple points of positioning information of the agricultural machine is taken as the trajectory (i.e., the operation row reference centerline).

Figure 3:
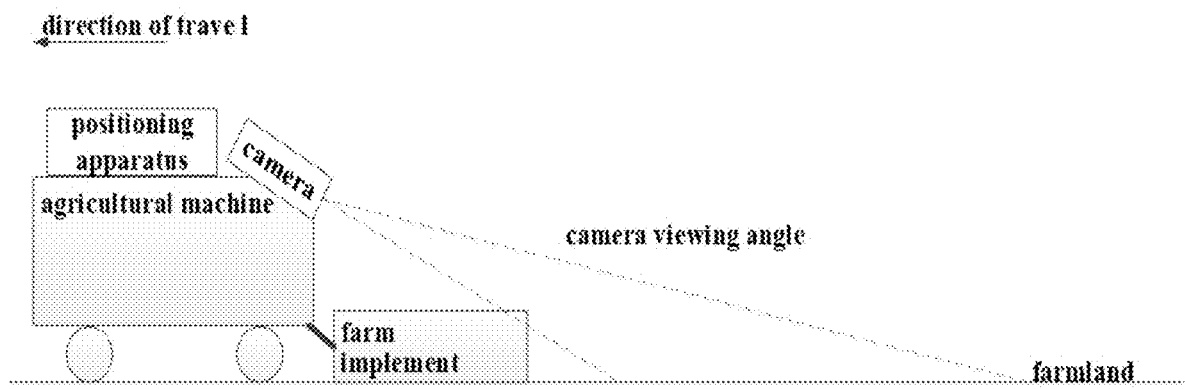
FIG. 3 illustrates a side view of an operation scenario of an agricultural machine according to some embodiments of the present disclosure.

FIG. 3 illustrates a side view of an operation scenario of an agricultural machine according to some embodiments of the present disclosure.

As shown in FIG. 3, the camera is mounted over backwards the agricultural machine and used for detecting a situation of the farmed farmland on the current row behind, and the positioning apparatus is mounted at any position of the agricultural machine and used for detecting the positioning information of the agricultural machine. The farm implement for the operation is mounted behind the agricultural machine.

If a depth camera or positioning apparatus is mounted on the farm implement, problems such as device power supply, communication, vibration impact and the like shall be considered separately, which is costly. According to some embodiments of the present disclosure, the depth camera or positioning apparatus is mounted on the agricultural machine, without the need of mounting a detection device on the farm implement, which is convenient and efficient in use and low in cost, can improve versatility of an automatic driving system, and reduce complexity of the system.

In some embodiments, the camera is the depth camera.

In the step S2, a boundary of the operated area of the farm implement on the current row is determined according to the image of the operated area of the farm implement on the current row.

Figure 4:
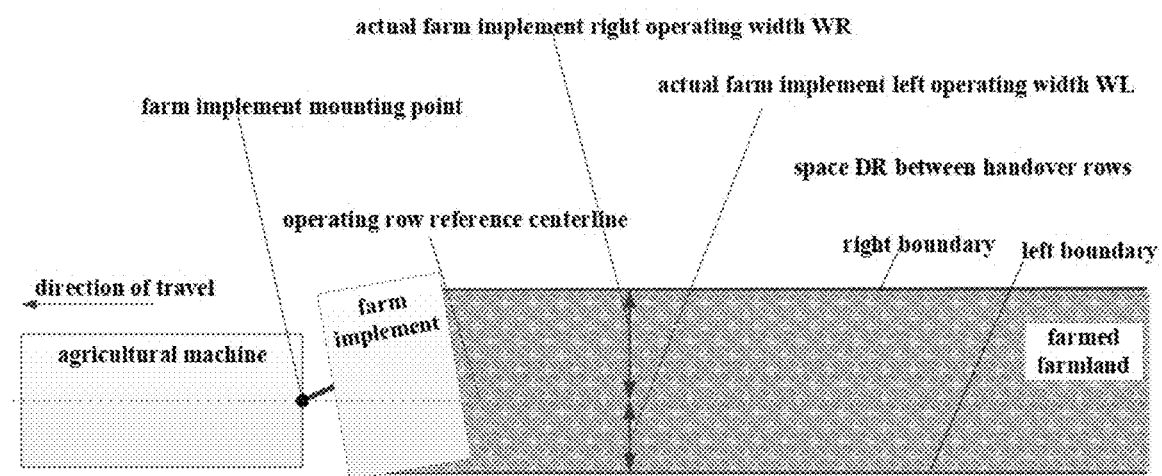
FIG. 4 illustrates a top view of an operation scenario according to other embodiments of the present disclosure.

FIG. 4 illustrates a top view of an operation scenario according to other embodiments of the present disclosure.

Ideally, a size of the farm implement is consistent with an actual operating width (i.e., a distance from a left boundary to a right boundary of a gray operated area in FIG. 4). Moreover, the left and right boundaries of the gray area are symmetrical with respect to the operation row reference centerline, i.e., theoretical and actual farm implement left operating widths are equal to theoretical and actual farm implement right operating widths.

However, as shown in FIG. 4, in a process of the actual operation, due to problems such as a mounting error of the farm implement, inclination of the farm implement or the like, the size of the farm implement is different from the actual operating width. Moreover, distances from the boundaries on the two sides of the farmed area on the current row to the operation row reference centerline are not equal, namely, the actual farm implement left operating width WL is not equal to the actual farm implement right operating width WR. Therefore, calibration is performed on the actual operating width herein.

Figure 5:
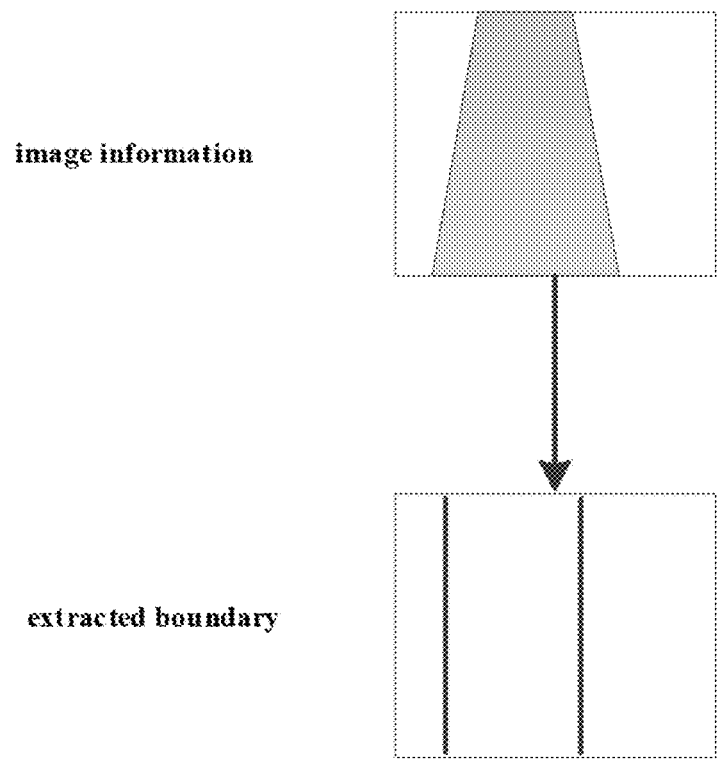
FIG. 5 illustrates a schematic diagram of boundary extraction according to some embodiments of the present disclosure.

FIG. 5 illustrates a schematic diagram of boundary extraction according to some embodiments of the present disclosure.

As shown in FIG. 5, the boundary of the farmed area is extracted from the image. In some embodiments, the boundary of the farmed area is parallel or nearly parallel to the trajectory of travel of the agricultural machine. It should be noted that although the boundaries on the two sides are showed in FIG. 5, it is allowed to extract only a boundary on one side according to subsequent needs.

In some embodiments, the determining a boundary of the operated area of the farm implement on the current row according to the image of the operated area of the farm implement on the current row comprises: determining a boundary of the operated area of the farm implement on the current row in a camera coordinate system of the camera according to the image of the operated area of the farm implement on the current row; and determining a boundary of the operated area of the farm implement on the current row in the global coordinate system according to the boundary of the operated area of the farm implement on the current row in the camera coordinate system, and a coordinate and a rotation parameter of the camera in the global coordinate system.

For example, the boundary is formed by a plurality of trajectory points. First, image processing is performed on the image output by the camera to extract coordinates of these trajectory points in the camera coordinate system. Then, by combining a mounting position (positioning information of the camera itself) and mounting angle of the camera, coordinate transformation is performed on the trajectory points in the camera coordinate system to obtain operation boundary trajectory points in the global coordinate system (namely, a navigation coordinate system).

A method of transforming the boundary from the camera coordinate system to the global coordinate system is described below.

It is assumed that a position coordinate of the camera in the navigation coordinate system O(x,y,z) is $(x_c, y_c, z_c)$. The mounting angle (rotation parameter) of the camera is $(\theta_x, \theta_y, \theta_z)$, i.e. angles of three rotation directions of the camera coordinate system with respect to the navigation coordinate system x, y, z. It is assumed that a coordinate of any trajectory point i included in the boundary of the operated area in the camera coordinate system $O_c(x,y,z)$ is $(x_{ci}, y_{ci}, z_{ci})$. Let $$X_{ci} = \begin{bmatrix} x_{ci} \\ y_{ci} \\ z_{ci} \end{bmatrix} \text{ and } X_c = \begin{bmatrix} x_c \\ y_c \\ z_c \end{bmatrix},$$

then a coordinate matrix of the trajectory point i in the navigation coordinate system is:

$$X_i = \begin{bmatrix} x_i \\ y_i \\ z_i \end{bmatrix} = R_z R_y R_x X_{ci} + X_c$$

and a coordinate $X_i$ of the point i in the navigation coordinate system is $(x_i, y_i, z_i)$.

$R_x$, $R_y$ and $R_z$ are rotation matrices, which are calculated according to the following formulas:

$$R_x = \begin{bmatrix} 1 & 0 & 0 \\ 0 & \cos(\theta_x) & -\sin(\theta_x) \\ 0 & \sin(\theta_x) & \cos(\theta_x) \end{bmatrix}$$

$$R_y = \begin{bmatrix} \cos(\theta_y) & 0 & \sin(\theta_y) \\ 0 & 1 & 0 \\ -\sin(\theta_y) & 0 & \cos(\theta_y) \end{bmatrix}$$

$$R_x = \begin{bmatrix} \cos(\theta_z) & -\sin(\theta_z) & 0 \\ \sin(\theta_z) & \cos(\theta_z) & 0 \\ 0 & 0 & 1 \end{bmatrix}.$$

In the step S3, an operating width of the farm implement is determined according to the trajectory of travel of the agricultural machine on the current row and the boundary of the operated area of the farm implement on the current row, wherein the operating width of the farm implement comprises an operating width of the farm implement on at least one side of two sides of the trajectory of travel of the agricultural machine on the current row.

For example, according to the boundary of actual operation traces of the farm implement on the farmland in the image and the trajectory for reference, calibration is performed on an operating width offset caused by problems such as inclination of the farm implement and the like, to calculate the actual operating width on the two sides of the trajectory instead of a theoretical offset amount, so as to eliminate a theoretical error and improve precision of the calibration on the operating width.

In some embodiments, the determining an operating width of the farm implement according to the trajectory of travel of the agricultural machine on the current row and the boundary of the operated area of the farm implement on the current row comprises: determining an operating width of the farm implement on one side of the trajectory of travel according to a distance between the trajectory of travel of the agricultural machine on the current row and a boundary on the one side of the two sides of the trajectory of travel of the agricultural machine on the current row of the operated area.

For example, referring to FIG. 3, a distance between the left boundary of the area where the farm implement have operated on the current row and the trajectory of travel of the agricultural machine on the current row is an operating width of the farm implement on a left side of the trajectory of travel. A distance between the right boundary of the area where the farm implement have operated on the current row and the trajectory of travel of the agricultural machine on the current row is an operating width of the farm implement on a right side of the trajectory of travel.

In some embodiments, the boundary of the operated area on the one side of the two sides of the trajectory of travel of the agricultural machine on the current row comprises a plurality of trajectory points, and the determining an operating width of the farm implement on one side of the trajectory of travel according to a distance between the trajectory of travel of the agricultural machine on the current row and a boundary of the operated area on the one side of the two sides of the trajectory of travel of the agricultural machine on the current row comprises: determining the operating width of the farm implement on the one side of the trajectory of travel according to an average value of vertical distances between the plurality of trajectory points of the boundary of the operated area on the one side of the two sides of the trajectory of travel of the agricultural machine on the current row and the trajectory of travel of the agricultural machine on the current row.

For example, the vertical distance from each trajectory point of the left boundary to the trajectory (reference line) is calculated, and then these distances are averaged to obtain the left width WL of the actual operation area. In the same way, the right width WR can be obtained.

In some embodiments, the determining an operating width of the farm implement according to the trajectory of travel of the agricultural machine on the current row and the boundary of the operated area of the farm implement on the current row comprises: determining an operating width of the farm implement in the global coordinate system according to the trajectory of travel of the agricultural machine on the current row in the global coordinate system and the boundary of the operated area of the farm implement on the current row in the global coordinate system.

For example, in the foregoing steps S1 and S2, the trajectory of travel of the agricultural machine on the current row in the global coordinate system and the boundary of the operated area of the farm implement on the current row in the global coordinate system are obtained, respectively, and the trajectory and the boundary are now unified in the same global coordinate system, so that the operating width is calculated in the global coordinate system.

In the step S4, a space between a trajectory of travel of the agricultural machine on a next row and the trajectory of travel of the agricultural machine on the current row is determined according to the operating width of the farm implement and a blank space between the current row and the next row.

Figure 6:
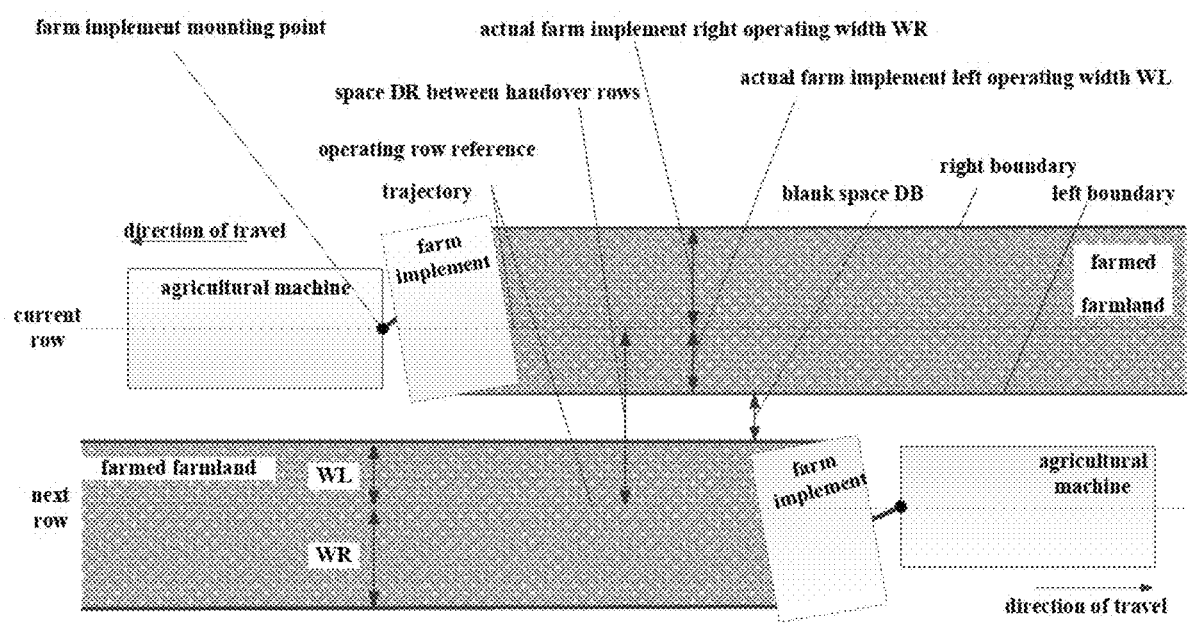
FIG. 6 illustrates a top view of an operation scenario according to further embodiments of the present disclosure.

FIG. 6 illustrates a top view of an operation scenario according to further embodiments of the present disclosure.

As shown in FIG. 6, at the time of row handover, it is necessary to secure the blank space DB between boundaries of operation areas of two adjacent rows, and no operation is performed on a blank area.

To ensure a reasonable actual blank space, a space DR at the next time of row handover (the space between the trajectory of travel of the agricultural machine on the next row and the trajectory of travel on the current row) is calculated based on at least one of the calculated farm implement left width WL and right width WR, and the preset blank space DB.

How to calculate the space (the space between the trajectory of travel of the agricultural machine on the next row and the trajectory of the agricultural machine on the current row in FIG. 6) DR between the handover rows on the premise of ensuring the blank space DB is described below.

In some embodiments, the determining a space between a trajectory of travel of the agricultural machine on a next row and the trajectory of travel of the agricultural machine on the current row according to the operating width of the farm implement and a blank space between the current row and the next row comprises: determining the space between the trajectory of travel of the agricultural machine on the next row and the trajectory of travel of the agricultural machine on the current row according to the operating width of the farm implement, the blank space between the current row and the next row, a direction of travel of the agricultural machine on the current row and a direction of travel of the agricultural machine on the next row.

Figure 7:
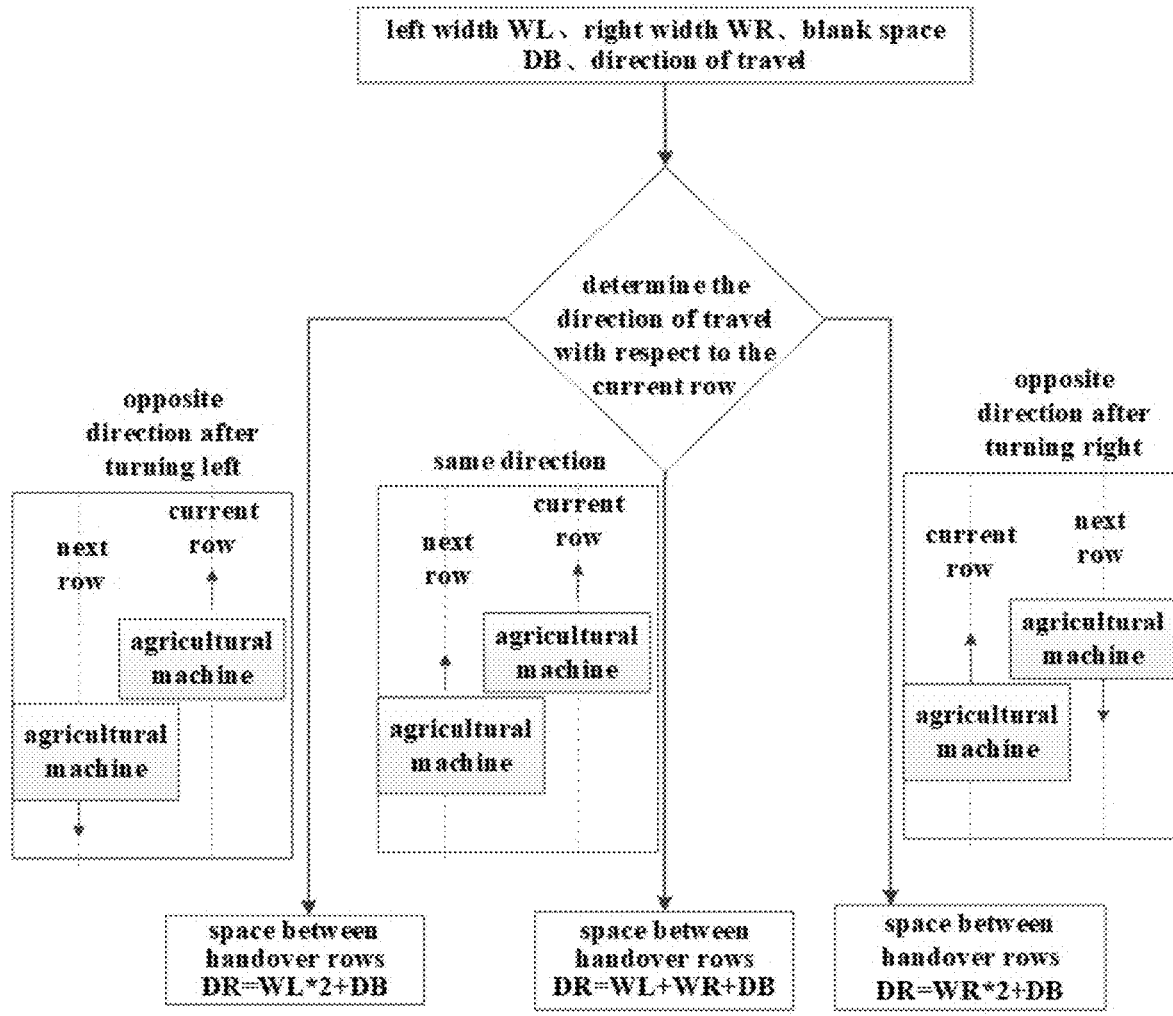
FIG. 7 illustrates a schematic diagram of a space calculation method according to some embodiments of the present disclosure.

FIG. 7 illustrates a schematic diagram of a space calculation method according to some embodiments of the present disclosure.

As shown in FIG. 7, based on the direction of travel on the current row relative to the next row, in combination with at least one of the calculated farm implement left width WL and right width WR, and the preset blank space DB, the space DR (the space between the trajectory of travel of the agricultural machine on the next row and the trajectory of travel of the agricultural machine on the current row) at the next time of row handover is calculated.

The determining the space between the trajectory of travel of the agricultural machine on the next row and the trajectory of travel of the agricultural machine on the current row according to the operating width of the farm implement, the blank space between the current row and the next row, a direction of travel of the agricultural machine on the current row and a direction of travel of the agricultural machine on the next row comprises: in a case where the direction of travel of the agricultural machine on the current row is the same as the direction of travel of the agricultural machine on the next row, determining the space between the trajectory of travel of the agricultural machine on the next row and the trajectory of travel of the agricultural machine on the current row according to a sum of the operating width of the farm implement on the one side of the two sides of the trajectory of travel of the agricultural machine on the current row, an operating width of the farm implement on the other side of the two sides of the trajectory of travel of the agricultural machine on the current row, and the blank space between the current row and the next row.

Continually referring to FIG. 7, if the direction of travel of the agricultural machine on the current row is the same as the direction of travel of the agricultural machine on the next row, the space DR between the trajectory of travel of the agricultural machine on the next row and the trajectory of travel of the agricultural machine on the current row is calculated according to the following equation:

$$DR = WL + WR + DB.$$

In some embodiments, the determining the space between the trajectory of travel of the agricultural machine on the next row and the trajectory of travel of the agricultural machine on the current row according to the operating width of the farm implement, the blank space between the current row and the next row, a direction of travel of the agricultural machine on the current row and a direction of travel of the agricultural machine on the next row comprises: in a case where the direction of travel of the agricultural machine on the current row is different from the direction of travel of the agricultural machine on the next row, determining the space between the trajectory of travel of the agricultural machine on the next row and the trajectory of travel of the agricultural machine on the current row according to a sum of twice an operating width on a same side of the trajectory of travel of the agricultural machine as the next row and the blank space between the current row and the next row.

If the direction of travel of the agricultural machine on the current row is opposite to the direction of travel of the agricultural machine on the next row, and the next row is on a left side of the current row, namely, the agricultural machine turns left at the time of row handover, the space DR between the trajectory of travel of the agricultural machine on the next row and the trajectory of travel of the agricultural machine on the current row is calculated according to the following equation:

$$DR=WL*2+DB$$

where WL is the width of the actual operation area on a left side of the trajectory, and DB is the blank space.

Similarly, if the direction of travel of the agricultural machine on the current row is opposite to the direction of travel of the agricultural machine on the next row, and the next row is on a right side of the current row, namely, the agricultural machine turns right at the time of row handover, the space DR between the trajectory of travel of the agricultural machine on the next row and the trajectory of travel of the agricultural machine on the current row is calculated according to the following equation:

$$DR=WR*2+DB$$

where WR is the width of the actual operation area on a right side of the trajectory, and DB is the blank space.

According to the automatic driving method of some embodiments of the present disclosure, the boundary of the operated area of the farm implement is determined according to the image of the operated area, the actual operating width on at least one side of the trajectory of the agricultural machine is further determined, and the space between the handover rows is calculated by using the actual operating width instead of the theoretical operating width. This improves precision of the calibration on the operating width of the farm implement, achieves fine farming of the agricultural machine, ensures the accurate actual blank space between the handover rows, and improves quality and efficiency of agricultural production.

Figure 8:
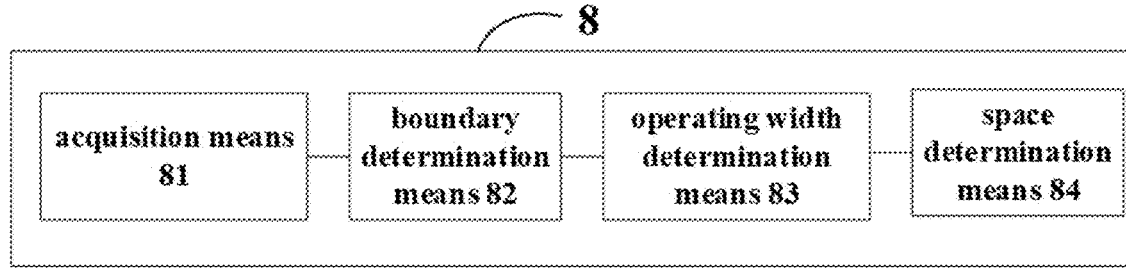
FIG. 8 illustrates a block diagram of an automatic driving apparatus according to some embodiments of the present disclosure.

FIG. 8 illustrates a block diagram of an automatic driving apparatus according to some embodiments of the present disclosure.

As shown in FIG. 8, the automatic driving apparatus 8 comprises an acquisition means 81, a boundary determination means 82, an operating width determination means 83, and a distance determination means 84.

The acquisition means 81 is configured to acquire a trajectory of travel of an agricultural machine on a current row and an image of an operated area of a farm implement connected with the agricultural machine on the current row, for example, execute the step S1 as shown in FIG. 1.

The boundary determination means 82 is configured to determine a boundary of the operated area of the farm implement on the current row according to the image of the operated area of the farm implement on the current row, for example, execute the step S2 as shown in FIG. 2.

The operating width determination means 83 is configured to determine an operating width of the farm implement according to the trajectory of travel of the agricultural machine on the current row and the boundary of the operated area of the farm implement on the current row, wherein the operating width of the farm implement comprises an operating width of the farm implement on at least one side of two sides of the trajectory of travel of the agricultural machine on the current row, for example, execute the step S3 as shown in FIG. 1.

The space determination means 84 is configured to determine a space between a trajectory of travel of the agricultural machine on a next row and the trajectory of travel of the agricultural machine on the current row according to the operating width of the farm implement and a blank space between the current row and the next row, for example, execute the step S4 as shown in FIG. 1.

According to the automatic driving apparatus of some embodiments of the present disclosure, the boundary of the operated area of the farm implement is determined according to the image of the operated area, the actual operating width on at least one side of the trajectory of the agricultural machine is further determined, and the space between the handover rows is calculated by using the actual operating width instead of the theoretical operating width. This improves precision of the calibration on the operating width of the farm implement, achieves fine farming of the agricultural machine, ensures the accurate actual blank space between the handover rows, and improves quality and efficiency of agricultural production.

Figure 9:
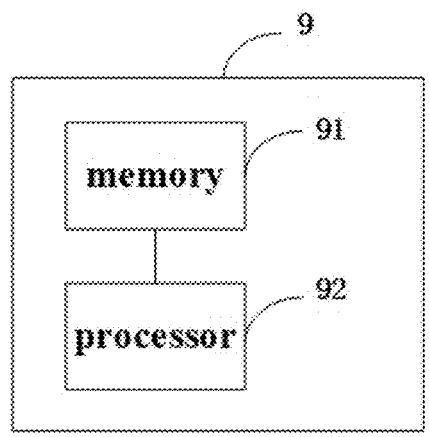
FIG. 9 illustrates a block diagram of an automatic driving apparatus according to other embodiments of the present disclosure.

FIG. 9 illustrates a block diagram of an automatic driving apparatus according to other embodiments of the present disclosure.

As shown in FIG. 9, the automatic driving apparatus 9 comprises a memory 91; and a processor 92 coupled to the memory 91, the memory 91 being used for storing the automatic driving method. The processor 92 is configured to perform, based on instructions stored in the memory 91, the automatic driving method in any of the embodiments of the present disclosure.

Figure 10:
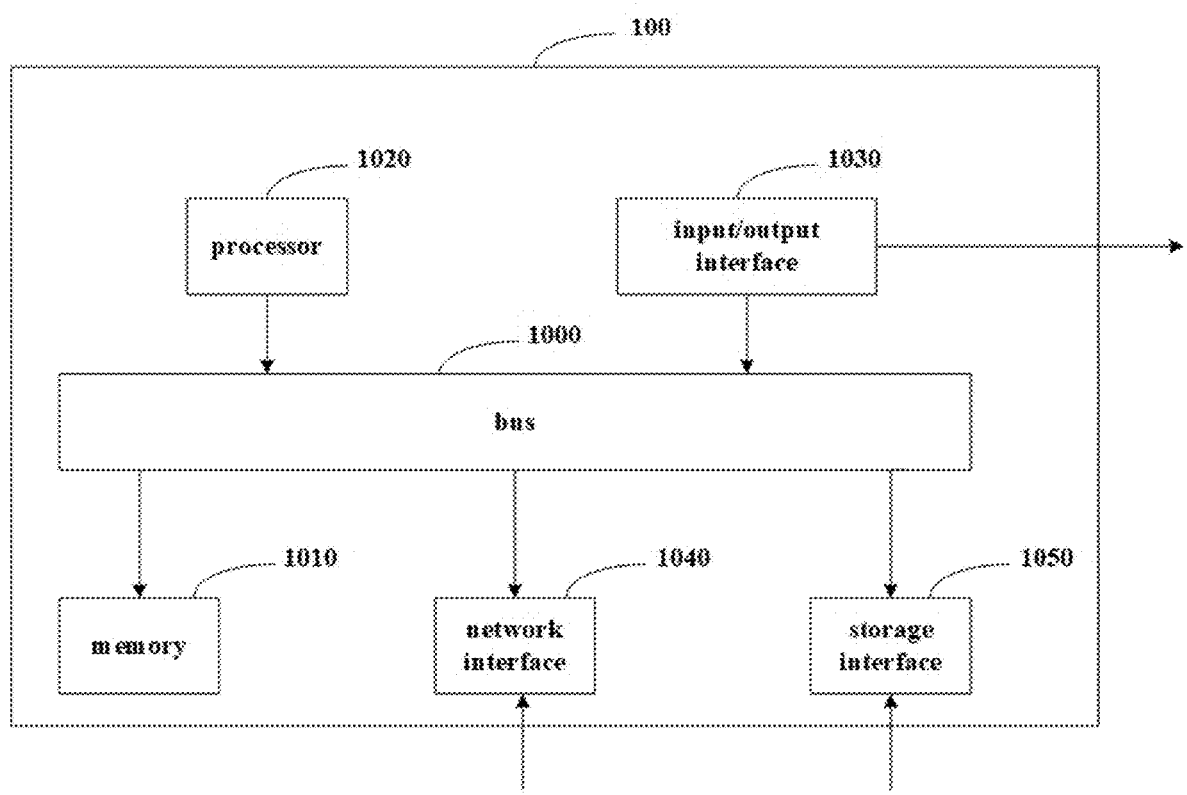
FIG. 10 illustrates a block diagram of a computer system for implementing some embodiments of the present disclosure.

FIG. 10 illustrates a block diagram of a computer system for implementing some embodiments of the present disclosure.

As shown in FIG. 10, a computer system 100 can take a form of a general-purpose computing device. The computer system 100 comprises a memory 1010, a processor 1020, and a bus 1000 connecting different system components.

The memory 1010 can include, for example, a system memory, a non-volatile storage medium, and the like. The system memory has thereon stored, for example, an operating system, an application, a boot loader, other programs and the like. The system memory can include a volatile storage medium, such as a random access memory (RAM) and/or cache memory. The non-volatile storage medium has thereon stored, for example, instructions for performing the automatic driving method in any of the embodiments of the present disclosure. The non-volatile storage medium includes, but is not limited to, a magnetic disk memory, an optical memory, a flash memory, and the like.

The processor 1020 can be implemented by using discrete hardware components, such as a general-purpose processor, a digital signal processor (DSP), an application specific integrated circuit (ASIC), a field programmable gate array (FPGA) or other programmable logic devices, a discrete gate or transistor, and the like. Accordingly, each module such as the judgment module and the determination module can be implemented by a central processing unit (CPU) executing instructions in the memory that perform the corresponding steps, or by a dedicated circuit that performs the corresponding steps.

The bus 1000 can use any of a variety of bus architectures. For example, the bus architecture includes, but is not limited to, an industry standard architecture (ISA) bus, micro channel architecture (MCA) bus, and peripheral component interconnect (PCI) bus.

The computer system 100 can further comprise an input/output interface 1030, network interface 1040, storage interface 1050, and the like. The interfaces 1030, 1040, 1050 and the memory 1010 can be connected with the processor 1020 via a bus 1000. The input/output interface 1030 can provide a connection interface for input/output devices such as a display, a mouse, and a keyboard. The network interface 1040 provides a connection interface for various networking devices. The storage interface 1050 provides a connection interface for external storage devices such as a floppy disk, a USB flash disk, and an SD card.

According to some embodiments of the present disclosure, there is provided an automatic driving system, comprising: the automatic driving apparatus according to any of the embodiments of the present disclosure; a positioning apparatus configured to generate positioning information of the agricultural machine; and a camera configured to generate the image of the operated area of the farm implement on the current row.

According to some embodiments of the present disclosure, there is provided an agricultural machine, comprising: the automatic driving apparatus according to any of the embodiments of the present disclosure; and a positioning apparatus configured to generate positioning information of the agricultural machine.

In some embodiments, the agricultural machine further comprises: a camera configured to generate the image of the operated area of the farm implement on the current row.

According to some embodiments of the present disclosure, there is further provided a computer program, comprising instructions which, when executed by a processor, cause the processor to perform the automatic driving method according to any of the embodiments of the present disclosure.

Various aspects of the present disclosure are described herein with reference to flow diagrams and/or block diagrams of the automatic driving method, apparatus and system, computer-readable storage medium and computer program product according to the embodiments of the present disclosure. It should be understood that each block of the flow diagrams and/or block diagrams, and a combination of blocks in the flow diagrams and/or block diagrams, can be implemented by computer-readable program instructions.

These computer-readable program instructions can be provided to a processor of a general-purpose computer, special-purpose computer, or other programmable devices to produce a machine, such that the instructions, which are executed via the processor, create means for implementing the functions specified in one or more blocks of the flow diagrams and/or block diagrams.

These computer-readable program instructions can also be stored in a computer-readable memory. These instructions cause a computer to work in a specific manner, thereby producing an article of manufacture that includes instructions implementing the functions specified in one or more blocks of the flow diagrams and/or block diagrams.

The present disclosure can take a form of an entire hardware embodiment, an entire software embodiment, or an embodiment combining software and hardware aspects.

By means of the automatic driving method, apparatus and system, the computer-readable storage medium, and the agricultural machine in the above embodiments, precision of the calibration on the operating width of the farm implement is improved, and a reasonable crop space is ensured.

So far, the automatic driving method, apparatus and system, the computer-readable storage medium, and the agricultural machine according to the present disclosure have been described in detail. Some details well known in the art have not been described in order to avoid obscuring the concepts of the present disclosure. Those skilled in the art can now fully appreciate how to implement the technical solutions disclosed herein, in view of the foregoing description.

What is claimed is:

1. An automatic driving method, comprising:
   acquiring a trajectory of travel of an agricultural machine on a current row and an image of an actual operated area of a farm implement connected with the agricultural machine on the current row, wherein the farm implement is mounted behind the agricultural machine along a direction of travel of the agricultural machine, and the trajectory of travel of the agricultural machine on the current row is a line connected by multiple points of positioning information of the agricultural machine obtained during travelling of the agricultural machine on the actual operated area;
   determining a boundary of the actual operated area of the farm implement on the current row according to the image of the actual operated area of the farm implement on the current row;
   determining an actual operating width of the farm implement according to the trajectory of travel of the agricultural machine on the current row and the actual boundary of the operated area of the farm implement on the current row, wherein the actual operating width of the farm implement is different from a size of the farm implement and comprises an actual left operating width and an actual right operating width of the farm implement on two sides of the trajectory of travel of the agricultural machine on the current row, the actual left operating width being a distance between a left boundary of the actual operated area and the trajectory of travel of the agricultural machine on the current row, the actual right operating width being a distance between a right boundary of the actual operated area and the trajectory of travel of the agricultural machine on the current row, and the actual left operating width being not equal to the actual right operating width;
   determining a space between a trajectory of travel of the agricultural machine on a next row and the trajectory of travel of the agricultural machine on the current row according to the actual operating width of the farm implement and a blank space between the current row and the next row, comprising:
   in a case where the direction of travel of the agricultural machine on the current row is the same as the direction of travel of the agricultural machine on the next row, determining the space between the trajectory of travel of the agricultural machine on the next row and the trajectory of travel of the agricultural machine on the current row according to a sum of the actual left operating width of the farm implement, the actual right operating width of the farm implement, and the blank space between the current row and the next row, and
   in a case where the direction of travel of the agricultural machine on the current row is different from the direction of travel of the agricultural machine on the next row, determining the space between the trajectory of travel of the agricultural machine on the next row and the trajectory of travel of the agricultural machine on the current row according to a sum of twice the actual left operating width or the actual right operating width on a same side of the trajectory of travel of the agricultural machine on the current row as the next row and the blank space between the current row and the next row; and controlling the agricultural machine to travel according to the trajectory of travel of the agricultural machine on the next row which is determined by the space.

2. The automatic driving method according to claim 1, wherein the left boundary or the right boundary of the actual operated area comprises a plurality of trajectory points, and the determining an actual operating width of the farm implement according to the trajectory of travel of the agricultural machine on the current row and the boundary of the actual operated area of the farm implement on the current row comprises:

determining the actual left operating width or the actual right operating width of the farm implement according to an average value of vertical distances between the plurality of trajectory points of the left boundary or the right boundary of the actual operated area and the trajectory of travel of the agricultural machine on the current row.

3. The automatic driving method according to claim 1, wherein the determining an operating width of the farm implement according to the trajectory of travel of the agricultural machine on the current row and the boundary of the actual operated area of the farm implement on the current row comprises:

determining an actual operating width of the farm implement in a global coordinate system, according to a trajectory of travel of the agricultural machine on the current row in the global coordinate system and a boundary of the actual operated area of the farm implement on the current row in the global coordinate system.

4. The automatic driving method according to claim 3, wherein the acquiring an image of an actual operated area of a farm implement connected with the agricultural machine on the current row comprises:

acquiring the image of the actual operated area of the farm implement on the current row from a camera mounted on the agricultural machine.

5. The automatic driving method according to claim 4, wherein the determining a boundary of the actual operated area of the farm implement on the current row according to the image of the actual operated area of the farm implement on the current row comprises:

determining the boundary of the actual operated area of the farm implement on the current row in a camera coordinate system of the camera according to the image of the actual operated area of the farm implement on the current row; and determining the boundary of the actual operated area of the farm implement on the current row in the global coordinate system according to the boundary of the actual operated area of the farm implement on the current row in the camera coordinate system, and a coordinate and a rotation parameter of the camera in the global coordinate system.

6. The automatic driving method according to claim 5, wherein the acquiring a trajectory of travel of an agricultural machine on a current row comprises:

acquiring the positioning information of the agricultural machine from a positioning apparatus mounted on the agricultural machine; and determining the trajectory of travel of the agricultural machine on the current row in the global coordinate system according to the positioning information of the agricultural machine.

7. An automatic driving apparatus, comprising:

a memory; and a processor coupled to the memory, the processor being configured to perform, based on instructions stored in the memory, an automatic driving method comprising:

acquiring a trajectory of travel of an agricultural machine on a current row and an image of an actual operated area of a farm implement connected with the agricultural machine on the current row, wherein the farm implement is mounted behind the agricultural machine along a direction of travel of the agricultural machine, and the trajectory of travel of the agricultural machine on the current row is a line connected by multiple points of positioning information of the agricultural machine obtained during travelling of the agricultural machine on the actual operated area;

determining a boundary of the actual operated area of the farm implement on the current row according to the image of the actual operated area of the farm implement on the current row;

determining an actual operating width of the farm implement according to the trajectory of travel of the agricultural machine on the current row and the boundary of the actual operated area of the farm implement on the current row, wherein the actual operating width of the farm implement is different from a size of the farm implement and comprises an actual left operating width and an actual right operating width of the farm implement on two sides of the trajectory of travel of the agricultural machine on the current row, the actual left operating width being a distance between a left boundary of the actual operated area and the trajectory of travel of the agricultural machine on the current row, the actual right operating width being a distance between a right boundary of the actual operated area and the trajectory of travel of the agricultural machine on the current row, and the actual left operating width being not equal to the actual right operating width; and determining a space between a trajectory of travel of the agricultural machine on a next row and the trajectory of travel of the agricultural machine on the current row according to the actual operating width of the farm implement and a blank space between the current row and the next row, comprising:

in a case where the direction of travel of the agricultural machine on the current row is the same as the direction of travel of the agricultural machine on the next row, determining the space between the trajectory of travel of the agricultural machine on the next row and the trajectory of travel of the agricultural machine on the current row according to a sum of the actual left operating width of the farm implement, the actual right operating width of the farm implement, and the blank space between the current row and the next row, and in a case where the direction of travel of the agricultural machine on the current row is different from the direction of travel of the agricultural machine on the next row, determining the space between the trajectory of travel of the agricultural machine on the next row and the trajectory of travel of the agricultural machine on the current row according to a sum of twice the actual left operating width or the actual right operating width on a same side of the trajectory of travel of the agricultural machine on the current row as the next row and the blank space between the current row and the next row; and controlling the agricultural machine to travel according to the trajectory of travel of the agricultural machine on the next row which is determined by the space.

8. The automatic driving apparatus according to claim 7, wherein the left boundary or the right boundary of the actual operated area comprises a plurality of trajectory points, and the automatic driving method further comprises:

determining the actual left operating width or the actual right operating width of the farm implement according to an average value of vertical distances between the plurality of trajectory points of the left boundary or the right boundary of the actual operated area and the trajectory of travel of the agricultural machine on the current row.

9. The automatic driving apparatus according to claim 7, wherein the automatic driving method further comprising:

determining the actual operating width of the farm implement in a global coordinate system, according to a trajectory of travel of the agricultural machine on the current row in the global coordinate system and a boundary of the actual operated area of the farm implement on the current row in the global coordinate system.

10. The automatic driving apparatus according to claim 9, wherein the automatic driving method further comprising:

acquiring the image of the actual operated area of the farm implement on the current row from a camera mounted on the agricultural machine.

11. A non-transitory computer-readable storage medium having thereon stored computer program instructions which, when executed by a processor, implement an automatic driving method comprising:

acquiring a trajectory of travel of an agricultural machine on a current row and an image of an actual operated area of a farm implement connected with the agricultural machine on the current row, wherein the farm implement is mounted behind the agricultural machine along a direction of travel of the agricultural machine, and the trajectory of travel of the agricultural machine on the current row is a line connected by multiple points of positioning information of the agricultural machine obtained during travelling of the agricultural machine on the actual operated area;

determining a boundary of the actual operated area of the farm implement on the current row according to the image of the actual operated area of the farm implement on the current row;

determining an actual operating width of the farm implement according to the trajectory of travel of the agricultural machine on the current row and the boundary of the actual operated area of the farm implement on the current row, wherein the actual operating width of the farm implement is different from a size of the farm implement and comprises an actual left operating width and an actual right operating width of the farm implement on two sides of the trajectory of travel of the agricultural machine on the current row, the actual left operating width being a distance between a left boundary of the actual operated area and the trajectory of travel of the agricultural machine on the current row, the actual right operating width being a distance between a right boundary of the actual operated area and the trajectory of travel of the agricultural machine on the current row, and the actual left operating width being not equal to the actual right operating width; and determining a space between a trajectory of travel of the agricultural machine on a next row and the trajectory of travel of the agricultural machine on the current row according to the actual operating width of the farm implement and a blank space between the current row and the next row, comprising:

in a case where the direction of travel of the agricultural machine on the current row is the same as the direction of travel of the agricultural machine on the next row, determining the space between the trajectory of travel of the agricultural machine on the next row and the trajectory of travel of the agricultural machine on the current row according to a sum of the actual left operating width of the farm implement, the actual right operating width of the farm implement, and the blank space between the current row and the next row, and in a case where the direction of travel of the agricultural machine on the current row is different from the direction of travel of the agricultural machine on the next row, determining the space between the trajectory of travel of the agricultural machine on the next row and the trajectory of travel of the agricultural machine on the current row according to a sum of twice the actual left operating width or the actual right operating width on a same side of the trajectory of travel of the agricultural machine on the current row as the next row and the blank space between the current row and the next row; and controlling the agricultural machine to travel according to the trajectory of travel of the agricultural machine on the next row which is determined by the space.

12. The non-transitory computer-readable storage medium according to claim 11, wherein the left boundary or the right boundary of the actual operated area comprises a plurality of trajectory points, and the automatic driving method further comprises:

determining the actual left operating width or the actual right operating width of the farm implement according to an average value of vertical distances between the plurality of trajectory points of the left boundary or the right boundary of the actual operated area and the trajectory of travel of the agricultural machine on the current row.

13. The non-transitory computer-readable storage medium according to claim 11, wherein the automatic driving method further comprises:

determining an actual operating width of the farm implement in a global coordinate system, according to a trajectory of travel of the agricultural machine on the current row in the global coordinate system and a boundary of the actual operated area of the farm implement on the current row in the global coordinate system.

14. The non-transitory computer-readable storage medium according to claim 13, wherein the automatic driving method further comprises:

acquiring the image of the actual operated area of the farm implement on the current row from a camera mounted on the agricultural machine.

* * * * *